US008258478B2

(12) United States Patent
Walters et al.

(10) Patent No.: US 8,258,478 B2
(45) Date of Patent: Sep. 4, 2012

(54) LOOKDOWN ZONE MASK FOR INTRUSION DETECTOR

(75) Inventors: Roert E. Walters, Webster, NY (US); William S. DiPoala, Fairport, NY (US)

(73) Assignee: Robert Bosch GmbH, Stuttgart (DE)

( * ) Notice: Subject to any disclaimer, the term of this patent is extended or adjusted under 35 U.S.C. 154(b) by 1330 days.

(21) Appl. No.: 11/463,025

(22) Filed: Aug. 8, 2006

(65) Prior Publication Data

US 2010/0237248 A1 Sep. 23, 2010

(51) Int. Cl.
*G01J 5/02* (2006.01)

(52) U.S. Cl. .................................. 250/342; 250/DIG. 1

(58) Field of Classification Search ............. 250/DIG. 1, 250/342
See application file for complete search history.

(56) References Cited

U.S. PATENT DOCUMENTS

| | | | | |
|---|---|---|---|---|
| 4,734,585 | A | 3/1988 | Owers | |
| 4,760,381 | A | 7/1988 | Haag | |
| 5,015,994 | A | 5/1991 | Hoberman et al. | |
| 5,026,990 | A | 6/1991 | Marman et al. | |
| 5,414,255 | A * | 5/1995 | Hampson | 250/221 |
| 5,818,337 | A | 10/1998 | Erismann | |
| 6,909,370 | B2 | 6/2005 | Nakamura et al. | |
| 6,987,267 | B1 | 1/2006 | Monroe et al. | |

* cited by examiner

*Primary Examiner* — Constantine Hannaher
(74) *Attorney, Agent, or Firm* — Faegre Baker Daniels LLP

(57) ABSTRACT

An apparatus for enabling and disabling a lookdown zone mask in an intrusion detector unit. The unit may include a passive infrared motion detector, a lens assembly, and a mask or cover which selectively enables and disables a lookdown zone associated with the detector. The lens assembly provides a lens proximate the detector. The lens provides the lookdown zone. When the mask substantially covers the lens, the lookdown zone is disabled because the path of radiant energy to the detector is blocked and prevents the detector from detecting any motion in the lookdown zone. When the mask does not cover the lens, the lookdown zone is enabled because the lens permits the path of radiant energy to the detector through the lens and allows the detector to detect any motion in the lookdown zone.

11 Claims, 12 Drawing Sheets

LOOKDOWN ZONE MASK FOR INTRUSION DETECTOR

BACKGROUND

1. Field of the Invention

The present invention relates to an intrusion detector system, and, more particularly, to an apparatus for enabling and disabling a lookdown zone mask in an intrusion detector unit.

2. Description of the Related Art

Passive infrared (PR) motion sensors are well-known. PIR motion sensors are useful due to less susceptibility to false alarms as compared to other technologies, for example, ultrasonic and microwave motion sensors. PIR motion sensors have no active component which is radiated from the unit, such as sound or radio waves, for their operation. In general, a PIR motion sensor is typically mounted on a wall or ceiling and protects a room or other area by imaging multiple areas of the room onto an infrared detector. The output of the detector is amplified and processed for alarm output from the motion sensor.

Prior PR motion sensors use a single Fresnel lens array or minor array to focus multiple areas of the room onto the detector. Although most of the areas of the room can be protected with this arrangement, the area directly below the sensor is typically out of range of the detector. To correct this situation, a "lookdown zone" capability was included in the motion sensor to add protection to the area directly below the sensor. The lookdown zone capability may be accomplished by adding a Fresnel lens near the detector which allows imaging of a small area, located almost directly below the sensor, onto the detector.

Referring to FIGS. 1 and 2, for example, intrusion detector unit 20 is shown and may include printed circuit board (PCB) or substrate 22, detector 24, lens assembly 26, and lens 28. PCB 22 includes circuitry (not shown) for processing of an alarm output from detector 24. Lens assembly 26 may include mounting structure 30 having two side supports 31. Mounting structure 30 is connected to PCB 22 and is operable to mount detector 24 and lens 28 in a given relationship relative to each other. Lens 28 provides the lookdown zone for unit 20, and, in an exemplary embodiment, lens 28 is a Fresnel lens, i.e., lens 28 is flat on one side facing detector 24 and ridged on the other side facing away from detector 24, as is commonly known.

While the arrangement of FIGS. 1 and 2 offers better protection than an intrusion detector system without a lookdown zone capability, certain environments are more susceptible to false alarms when the lookdown zone is enabled in the motion sensor. For example, pets can trigger the alarm in a residential setting and rodents can trigger the alarm in a commercial setting. To prevent such unwanted false alarms, the lookdown zone may incorporate a mask to disable the lookdown zone. The mask may be a colored masking tape which is die cut to fit over the lens used for the lookdown zone. Alternatively, the mask may be a removable, adhesive paper that covers the lens used for the lookdown zone. The mask may be installed during manufacture of the intrusion detector unit and remain until the user desires removal thereof if there is only a small chance of false alarms occurring and the end user wants the additional coverage provided by the lookdown zone.

Referring to FIG. 3, for example, unit 20 may include lens mask or cover 32 which may be attached to lens 28 prior to installation of unit 20 in a desired location. Mask 32 may be attached to lens 28 by an adhesive to facilitate later removal of mask 32 from lens 28 if desired by an installer or end user. If mask 32 is removed from lens 28, the lookdown zone is enabled because lens 28 permits radiant energy to pass through to detector 24, and if mask 32 remains attached to lens 28, the lookdown zone remains disabled because mask 32 covers lens 28 and prevents radiant energy to pass through mask 32 to detector 24. One example of an adhesive mask is shown in U.S. Pat. No. 5,026,990.

Once the installer or end user has removed and discarded the tape or paper used to mask the lookdown zone, however, the lookdown zone cannot be remasked should the environment change and/or false alarms become a problem without risking damage to other components of the intrusion detector unit, for example, the printed circuit board. Furthermore, if the installer does not remove the mask during installation, an end user must later disassemble the intrusion detector unit and remove the mask to enable the lookdown zone at a later time. Such an operation similarly risks damage to the printed circuit board and other internal components of the intrusion detector unit. Damage to any internal components of the unit and/or disassembly and reassembly of the unit may undesirably make the intrusion detector unit less effective, completely inoperable, or more susceptible to tampering by an intruder.

U.S. Pat. No. 6,987,267 discloses a lens blind or door for a motion detector. The blinds or doors are rotatably mounted within a housing and serve to limit, enlarge, or otherwise control the detection angle of the PIR sensors. The blinds include control knobs by means of which the blinds can be rotated to define the desired detection angle. Opaque doors are used to block or limit the detection angle of the sensor. The doors are not used to either enable or disable a lookdown zone, but are rather to customize the detection angle of the motion detector.

U.S. Pat. No. 5,015,994 discloses a security light controlled by a motion detector which includes a vision extender. The vision extender permits the user to select the field of view of the motion detector. By locating the vision extender at different points along the arc of a lens, optimal viewing can be achieved for a particular location of the motion detector.

U.S. Pat. No. 5,818,337 discloses a masked passive infrared intrusion detection device wherein a masking element is used to block or mask a part of the infrared radiation from a lookdown space. By means of this arrangement, pyroelectric detector elements are shaded from viewing the lens element on the opposite side by a different amount. When an intruder enters into the detection pattern, the intruder will be visible to a larger extent by one of the single detector elements, thereby improving the effectiveness of the detector.

What is needed in the art is a lookdown zone mask for an intrusion detector that permits repeated switching from an enabled to a disabled lookdown zone.

SUMMARY

The present invention provides an apparatus for enabling and disabling a lookdown zone mask in an intrusion detector unit. The unit may include a passive infrared motion detector, a lens assembly, and a mask or cover which selectively enables and disables a lookdown zone associated with the detector. The lens assembly provides a lens proximate the detector. The lens provides the lookdown zone. When the mask substantially covers the lens, the lookdown zone is disabled because the path of radiant energy to the detector is blocked and prevents the detector from detecting any motion in the lookdown zone. When the mask does not cover the lens, the lookdown zone is enabled because the lens permits the path of radiant energy to the detector through the lens and allows the detector to detect any motion in the lookdown zone. In one embodiment, the mask is actuated between an enabled position and a disabled position via a cam mechanism. In another embodiment, the mask is actuated between the enabled position and the disabled position via a pivoting door. In yet another embodiment, the mask is actuated between the enabled position and the disabled position via a sliding door.

In one form thereof, the present invention provides an apparatus for detecting movement, including a detector mounted in the apparatus; a lens assembly mounted proximate the detector; and a mask associated with the lens assembly, the mask movable between a first, open position and a second, closed position, wherein the mask in the first position enables a lookdown zone associated with the apparatus and the mask in the second position disables the lookdown zone associated with the apparatus.

In another form thereof, the present invention provides an apparatus for enabling and disabling a lookdown zone in an intrusion detector unit including a substrate and a housing, the apparatus including a detector mounted within the housing; a lens mounted proximate the detector, the lens capable of providing the lookdown zone; and a cover associated with the lens, the cover movable between a first, lookdown zone enabled position and a second, lookdown zone disabled position, wherein the cover in the second position substantially covers the lens.

In yet another form thereof, the present invention provides a method for enabling and disabling a lookdown zone, the method including the steps of providing an intrusion detector unit including a detector, a lens mounted proximate the detector and capable of providing the lookdown zone, a mask associated with the lens, and an actuating mechanism; moving the actuating mechanism in a first direction; and moving the mask in response to movement of the actuating mechanism in the first direction, wherein the mask is moved from a first, lookdown zone enabled position to a second, lookdown zone disabled position.

An advantage of the present invention is the easy accessibility provided to enable and disable a lookdown zone in an intrusion detector unit.

Another advantage is the reusability of the mask or cover to selectively provide a lookdown zone at the desire of an end user without destroying an existing mask or requiring application of a new mask which may require disassembly of the entire unit.

Yet another advantage is that the lookdown zone is selectively enabled or disabled without requiring access to the interior of the detector unit, thereby helping to prevent unauthorized tampering of the unit and maintaining the integrity of the unit as a whole by preventing damage to internal components thereof. For example, exposure of the printed circuit board of the unit is advantageously prevented when changing the state of the lookdown zone.

Still another advantage is the ability to retrofit existing intrusion detector units with a mask according to the several embodiments disclosed herein.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
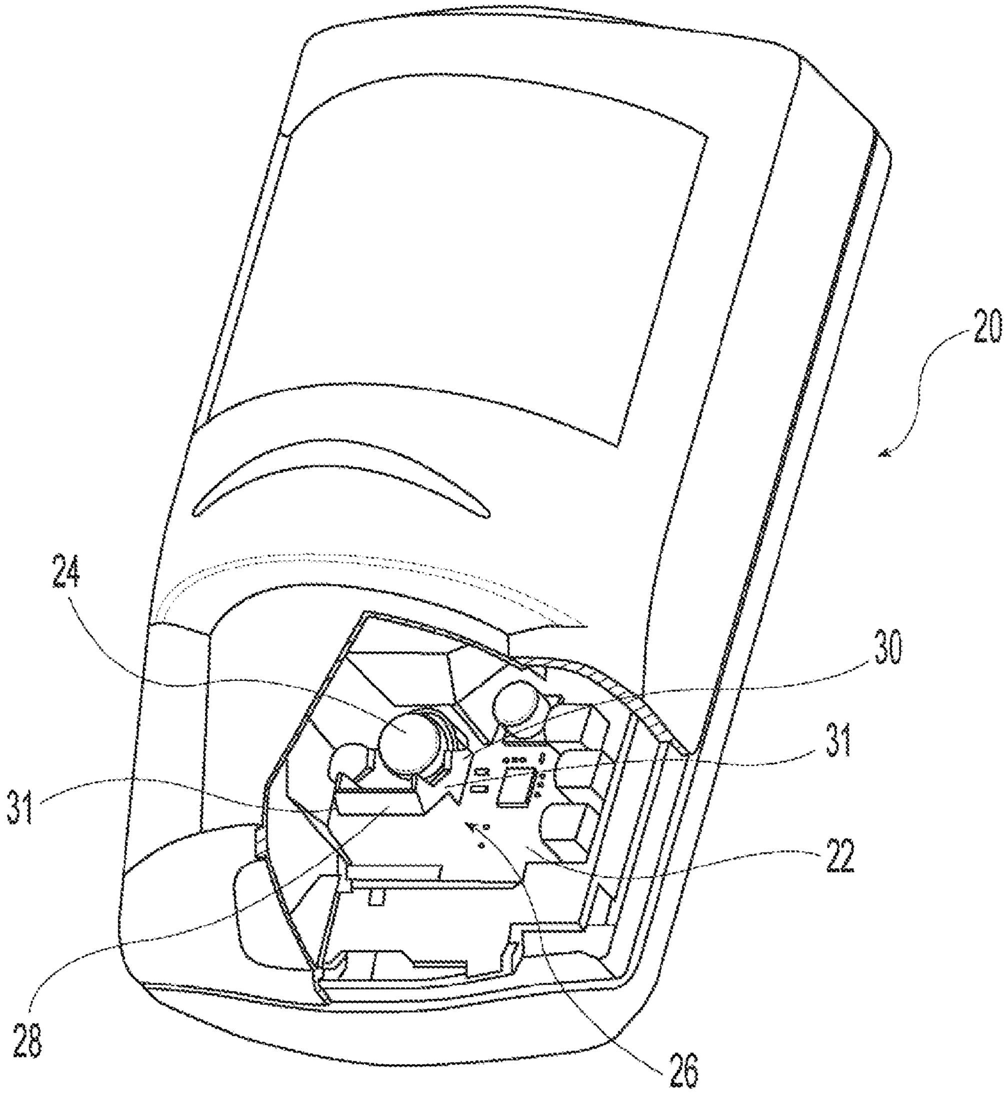
Fig. 1 (Prior Art)
FIG. 1 is a perspective view of an intrusion detector unit, with a portion broken away in section, further illustrating a known detector and lens assembly.
Figure 2:
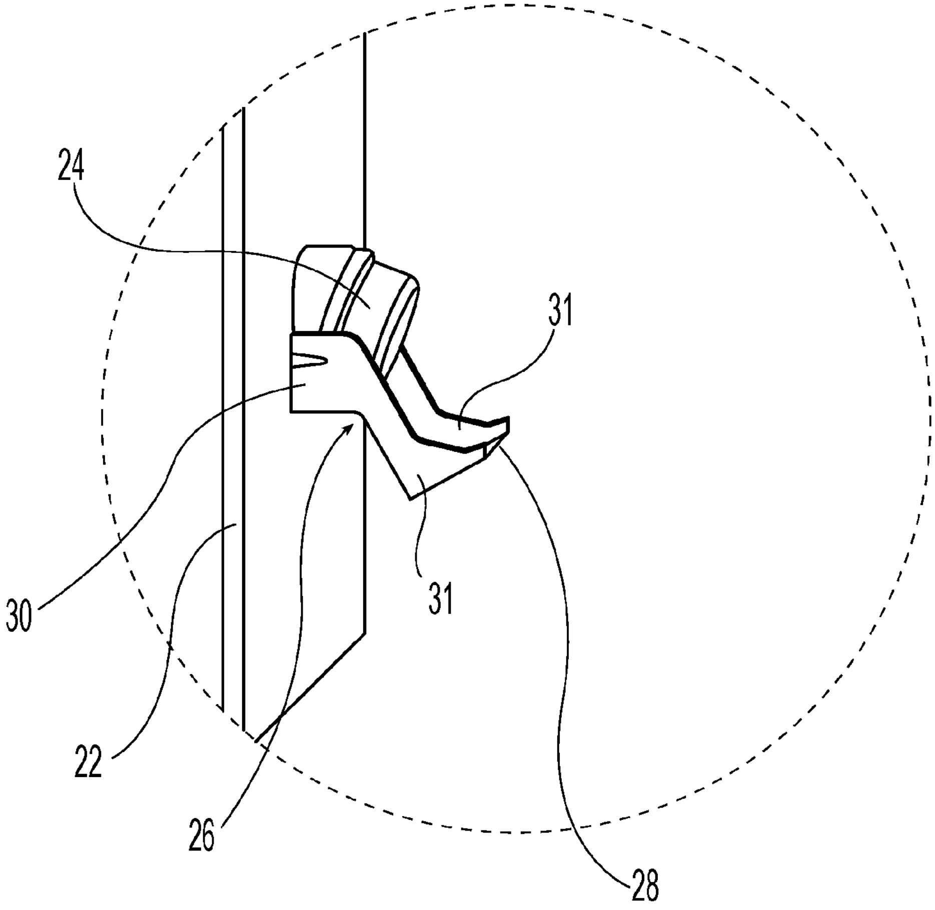
Fig. 2 (Prior Art)
FIG. 2 is a close-up perspective view of the detector and lens assembly of FIG. 1.
Figure 3:
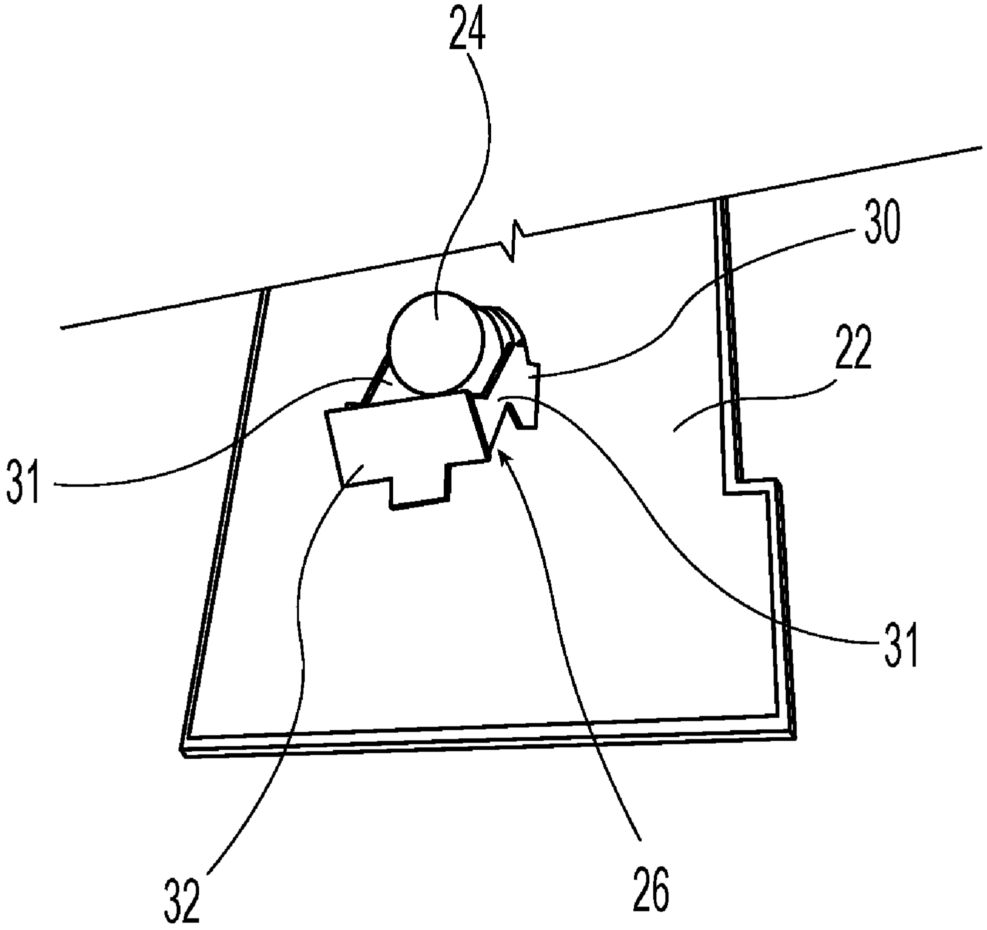
Fig. 3 (Prior Art)
FIG. 3 is a close-up perspective view of the detector and lens assembly of FIG. 1, further illustrating a known mask covering the lens.

Corresponding reference characters indicate corresponding parts throughout the several views. Although the exemplifications set out herein illustrate the invention, in various forms, the embodiments disclosed below are not intended to be exhaustive or to be construed as limiting the scope of the invention to the precise forms disclosed.

DETAILED DESCRIPTION

Figure 4:
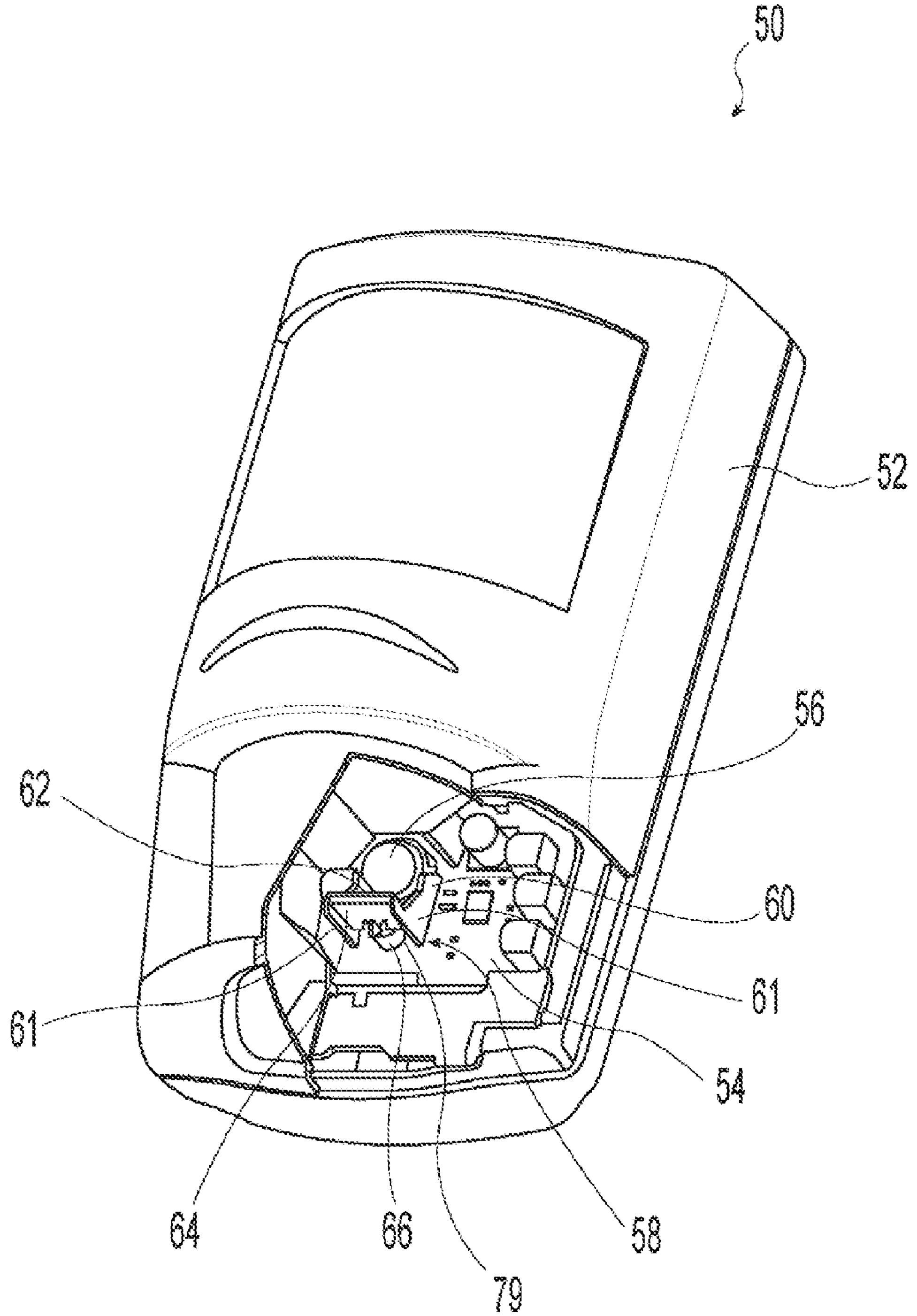
FIG. 4 is a perspective view of an intrusion detector unit according to one embodiment, with a portion broken away in section, illustrating a detector, lens assembly, and lookdown zone mask.

Referring now to the drawings, and particularly to FIG. 4, motion sensor or intrusion detector unit 50 is shown and includes housing 52, printed circuit board (PCB) or substrate 54, detector 56, and lens assembly 58. Lens assembly 58 may include mounting structure 60 and lens 62. In an exemplary embodiment, detector 56 is a passive infrared motion detector.

Figure 5:
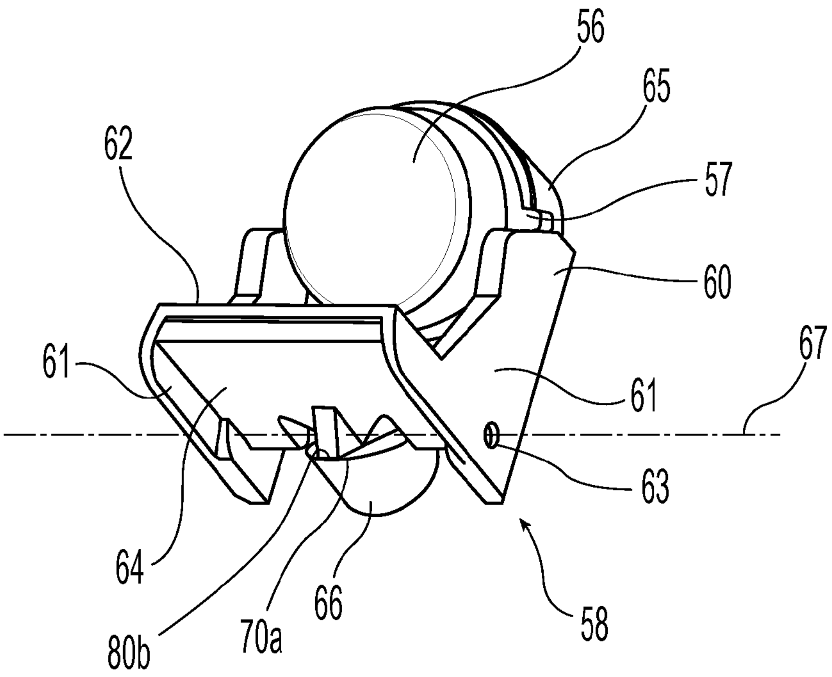
FIG. 5 is a close-up perspective view of the detector, lens assembly, and lookdown zone mask of FIG. 4, further illustrating the mask in a closed, disabled position.
Figure 6:
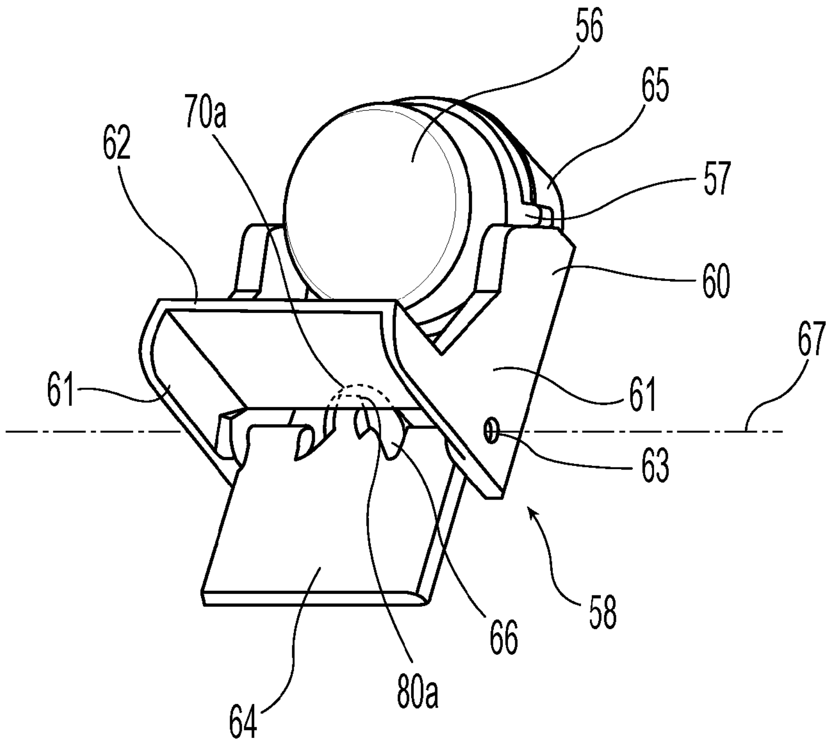
FIG. 6 is a close-up perspective view of the detector, lens assembly, and lookdown zone mask of FIG. 4, further illustrating the mask in an open, enabled position.
Figure 12A:
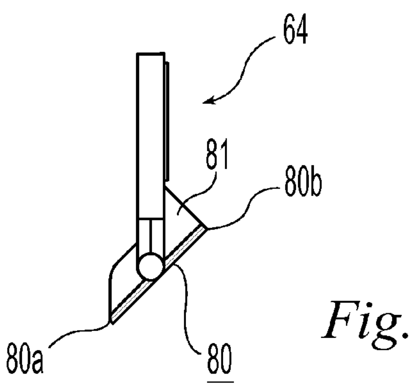
FIGS. 12*a*-12*d* are perspective views of the lookdown zone mask of FIGS. 4-6.
Figure 12B:
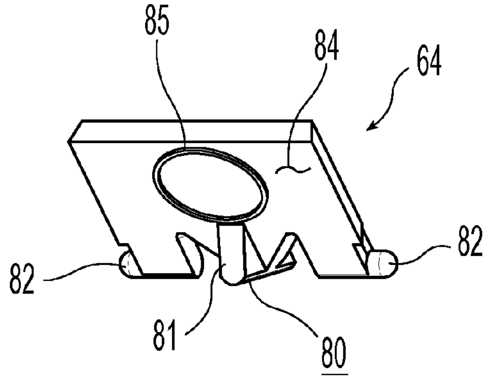
Figure 12C:
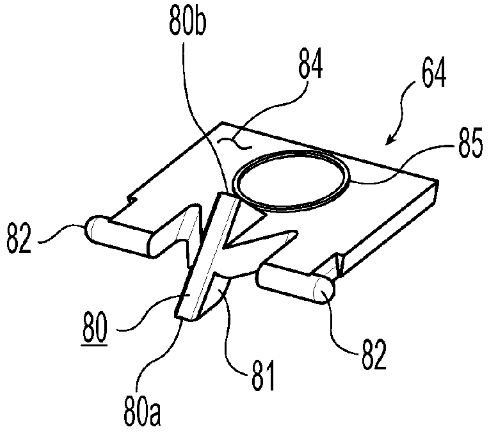
Figure 12D:
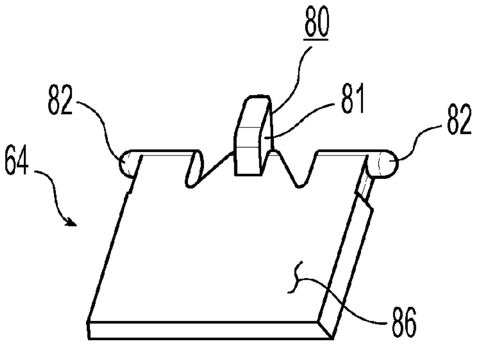

As shown in FIGS. 4-6 and 10, lens assembly 58 provides for mounting of lens 62 and detector 56 in a given and constant relationship relative to each other. In one embodiment, lens 62 may be formed as a Fresnel lens, i.e., lens 62 is flat on one side facing detector 56 and ridged on the other side facing away from detector 56. Lens 62 provides a lookdown zone capability to unit 50 to add greater protection to the area directly below unit 50 by allowing imaging of a small area almost directly therebelow. Mounting structure 60 may include two side supports 61 attached to PCB 54. Side supports 61 each include aperture 63 extending therethrough for engagement with mounting posts or extensions 82 (FIGS. 12*b-d*) of mask 64, as described below. As shown in FIGS. 5 and 6, mounting structure 60 may further include connecting portion 65 which connects side supports 61 and includes detector mount 59 (FIG. 10) for support and mounting of detector 56 thereon. Side supports 61 and connecting portion 65 of mounting structure 60 may be attached to PCB 54 via any suitable adhesive, bonding, soldering, or other connection. Detector 56 may include flange or extension 57 (FIGS. 5 and 6) to engage in abutting relationship with a side support 61. Although only one such flange 57 is shown, detector 56 may include flange 57 on approximately diametrically opposite sides thereof for similar mating engagement with the other of side supports 61. Detector 56 may include structure (not shown) on a backside thereof to be press fit into apertures 55 provided in detector mount 59 or, detector 56 may be attached to detector mount 59 via any suitable adhesive. In this way, detector 56 and lens 62 may be spaced a constant and known distance from each other. Detector 56 may be electrically connected to PCB 54 via wires or other electronic communication devices which are routed through apertures 55 in detector mount 59 from detector 56 to PCB 54 to provide communication between detector 56 and PCB 54.

Referring now to FIGS. 4-6 and 12*a-d*, mask or cover 64 is shown. As shown specifically in FIGS. 12*a-d*, mask 64 includes mounting posts or extensions 82, first surface or face 84, and second surface or face 86. Mask 64 also includes angled portion 81 having angled engagement surface 80. Angled surface 80 includes ends 80*a* and 80*b* and defines an angle which substantially matches the angle on cam surface 70 (FIGS. 11*a-b*), as described below. Mask 64 may be any opaque material, i.e., any material which does not transmit or reflect light or radiant energy, e.g., various metals or alloys, a plastic or polymer-based material, or a paper-based material. Mask 64 may include indicator structure 85 on first surface 84. The function of indicator structure 85 is to provide an installer with a reference in order to prevent backwards installation of mask 64. Alternatively, unit 50 may include mounting posts 82 having two differently sized mounting posts 82 and mounting structure 60 having corresponding differently sized apertures 63 to prevent backward installation of mask 64.

Figure 7:
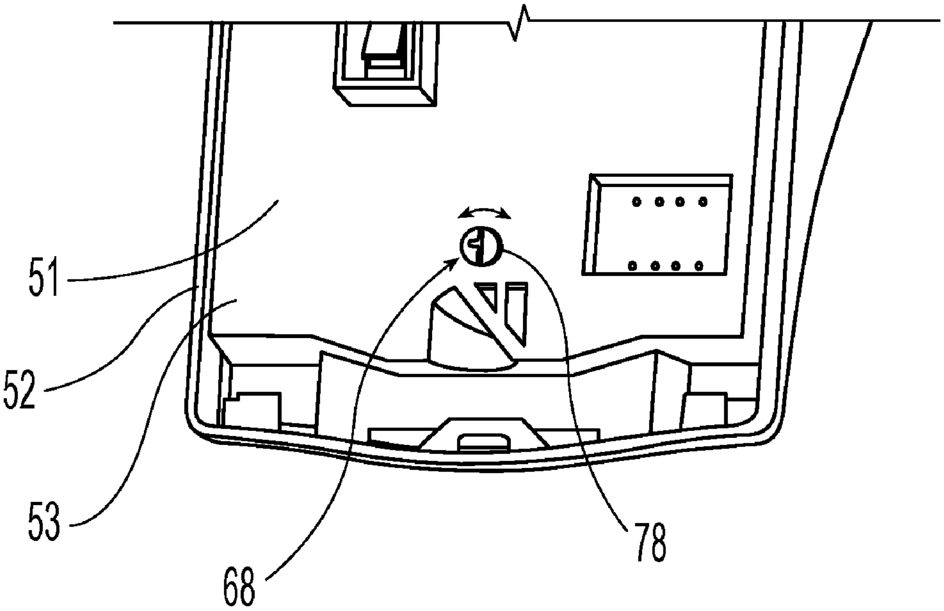
FIG. 7 is a perspective view of a back side of an inner housing of the intrusion detector unit of FIG. 4.

Referring now to FIGS. 4-6 and 11*a-c*, cam 66 is shown. As shown specifically in FIGS. 11*a-c*, cam 66 includes first portion 72, second portion 74, and third portion 76. First portion 72 extends through aperture 79 (FIG. 4) in PCB 54 and provides cam surface 70 for engagement with angled surface 80 (FIGS. 12*a-d*), as described below. Cam surface 70 includes ends 70*a* and 70*b* and defines an angle which substantially matches the angle on angled surface 80 (FIGS. 12*a-d*). Second portion 74 may be positioned between PCB 54 and intermediate or inner housing 53 (FIG. 7) and operates to maintain cam 66 in relation to mask 64 and prevent any translational movement of cam 66 with respect to PCB 54. Inner housing 53 is positioned within housing 52 and provides protection for PCB 54 within housing 52. Inner housing 53 includes a protruding portion which extends from a front side (not shown, and opposite to backside 51 (FIG. 7)) to provide an interference for a portion of second portion 74, as described below. Third portion 76 may extend from second portion 74 and through aperture 78 in backside 51 (FIG. 7) of intermediate housing 53 (FIG. 7). Advantageously, cam 66 is very compact and can easily be incorporated into the design of PCB 54.

Figure 11A:
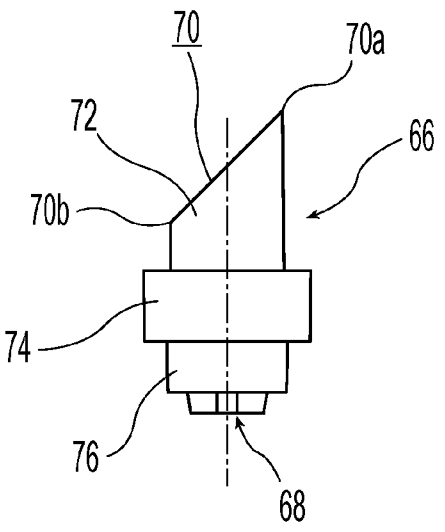
FIGS. 11*a*-11*c* are perspective views of the cam of FIGS. 4-7.
Figure 11B:
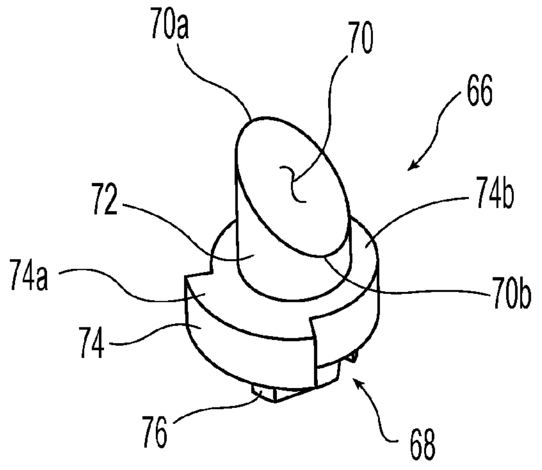
Figure 11C:
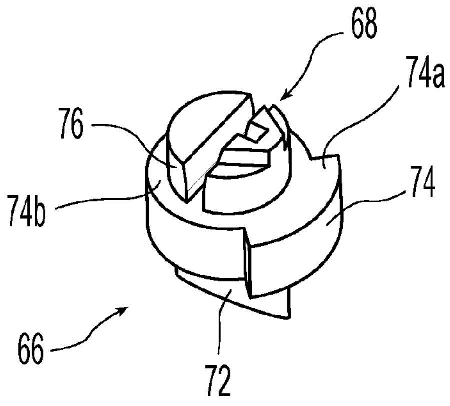

Referring to FIGS. 11*a-c*, second portion 74 includes portions 74*a* and 74*b*. Portion 74*a* protrudes from the circular cross-section of portion 74*b* and provides an interference between second portion 74 and the protruding portion (not shown) of inner housing 53 (FIG. 7). The interference between portion 74*a* and intermediate housing 53 prohibits cam 66 from a complete 360° rotation and instead allows cam 66 to rotate only 180°. Advantageously, cam 66 is prevented from endless rotation and allows a user to easily and conveniently determine when cam 66 has moved mask 64 to either a completely closed position or a completely open position by the inability to further rotate cam 66 in the same direction. Referring now to FIGS. 7 and 11*a-c*, third portion 76 may include engagement structure 68. Engagement structure 68 may be shaped in any configuration to mate with a rotation-imparting tool (not shown) to provide rotation to cam 66. For example, as shown in FIG. 7, a small screwdriver opening is provided as structure 68. Alternatively, structure 68 could be shaped as an aperture to accept a polygonal wrench.

In operation, engagement structure 68 may be initially positioned as shown in FIG. 7 and mask 64 is positioned to substantially cover lens 62, as shown in FIG. 5. In this closed, disabled position, the lookdown zone provided by lens 62 is disabled because mask 64 prevents any transmission of radiant energy to detector 56. In the closed position, mask 64 may be substantially perpendicular to PCB 54, as shown in FIG. 5. When the lookdown zone is disabled, end 80*b* of surface 80 of mask 64 is proximate end 70*a* of cam surface 70 of cam 66 and end 80*a* of surface 80 is proximate end 70*b* of cam surface 70. Engagement structure 68, as shown in FIG. 7, is rotated clockwise by a suitable rotation-imparting tool (not shown). Rotation of engagement structure 68 thereby imparts rotation to cam 66 and cam surface 70. Due to the engagement of cam surface 70 with angled surface 80 of mask 64, upon rotation of cam 66, cam surface 70 actuates mask 64 to rotate about axis 67 which is perpendicular to the axis of rotation of cam 66. Engagement of posts 82 of mask 64 with apertures 63 of mounting structure 60 facilitates rotation of mask 64 about axis 67 and prevents any translational movement of mask 64.

Upon a full 180° rotation of cam 66 via engagement structure 68, end 80*b* of surface 80 is now proximate end 70*b* of cam surface 70 and end 80*a* of surface 80 is proximate end 70*a* of cam surface 70, as shown in FIG. 6. In this open, enabled position, mask 64 is positioned as shown in FIG. 6, thereby uncovering lens 62 and enabling the lookdown zone. In the open position, mask 64 is substantially parallel with PCB 54 and positioned such that radiant energy may be transmitted to detector 56 via lens 62. Advantageously, mask 64 may be easily returned to the closed, disabled position upon a 180° counterclockwise rotation of engagement structure 68 to return cam 66 to the position shown in FIG. 5. Advantageously, mask 64 is easily accessible via backside 51 of inner housing 53 of unit 50. Furthermore, mask 64 is essentially a reusable mask or cover which allows an end user of unit 50 to selectively provide a lookdown zone without destroying an existing mask or requiring application of a new mask which may require disassembly of the entire unit 50. The lookdown zone is thus selectively enabled or disabled without requiring access to the interior of unit 50, thereby helping to prevent unauthorized tampering of unit 50 and maintaining the integrity of unit 50 as a whole by preventing damage to internal components thereof. For example, exposure of PCB 54 is advantageously prevented when changing the state of the lookdown zone.

In an alternative embodiment, actuation of cam 66 may be accomplished via an electric motor or other electronic device (not shown). A user of unit 50 may simply press a button on unit 50 to electrically actuate cam 66 and rotate mask 64 between the open and closed positions. Furthermore, unit 50 may be provided with a remote control feature to allow the user to remotely control actuation of cam 66 at a distance from unit 50, e.g., from a central control station or from across a room. In another embodiment, unit 50 may be provided with a timing feature that allows cam 66 to actuate mask 64 into the closed position, for example, during peak traffic hours to provide for fewer false alarms, and into the open position, for example, during off-peak traffic hours such as during night-time hours to provide for greater protection.

Figure 8:
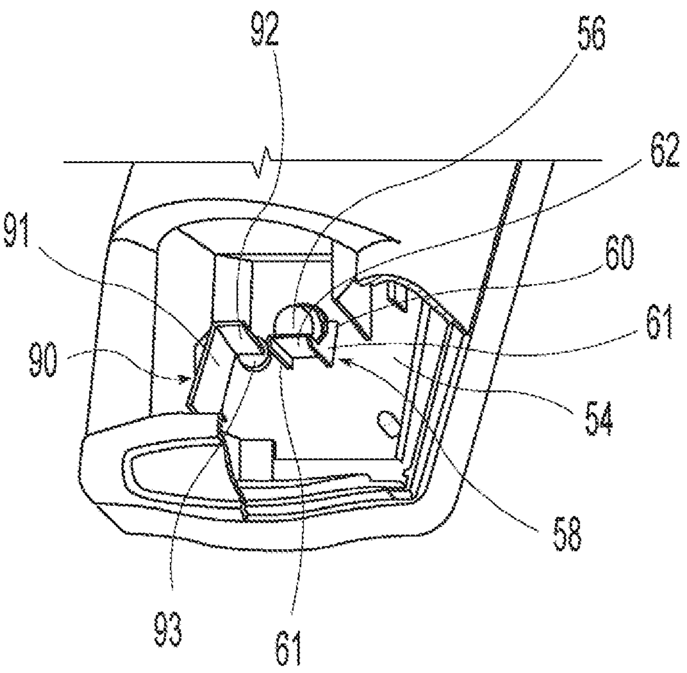
FIG. 8 is a close-up perspective view of a detector, lens assembly, and lookdown zone mask of an intrusion detector unit according to another embodiment, with a portion broken away in section, further illustrating the lookdown zone mask in an open, enabled position.
Figure 9:
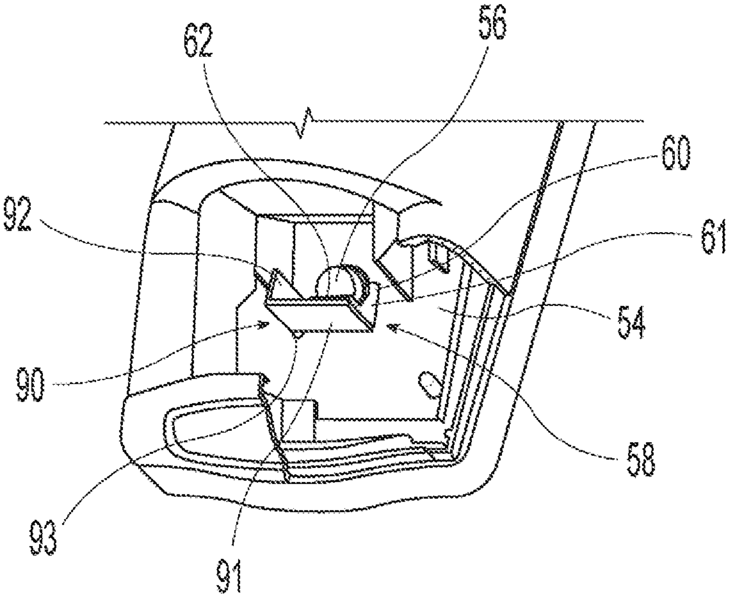
FIG. 9 is a close-up perspective view of the detector unit of FIG. 8, with a portion broken away in section, further illustrating the lookdown zone mask in a closed, disabled position.
Figure 10:
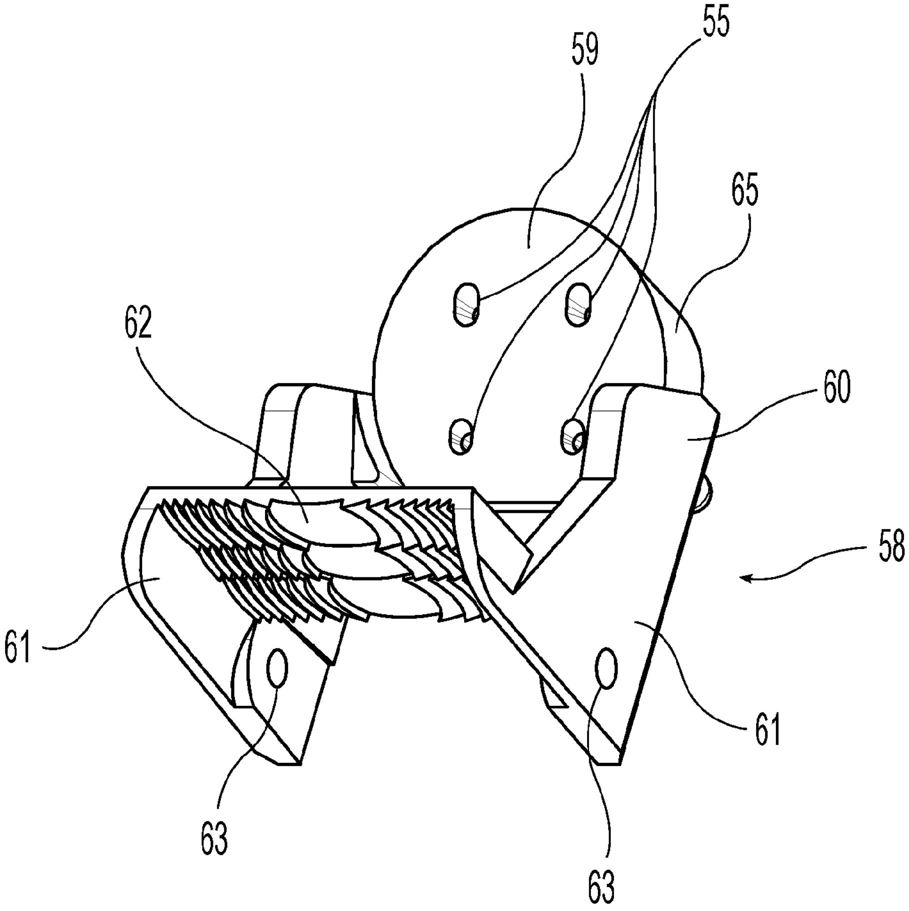
FIG. 10 is a perspective view of the lens assembly of FIGS. 4-6, 8, and 9.

In an alternative embodiment shown in FIGS. 8 and 9, a door or cover 90 is utilized in the intrusion detector unit to provide the selective enablement and disablement of the lookdown zone associated with detector 56. Door or cover 90 may be mounted to PCB 54 via rod or bar 93. Rod 93 may extend through PCB 54 and out the backside of PCB 54 and an inner housing, similar to cam 66 (FIGS. 4-7) described above. Rod 93 may include structure (not shown) similar to engagement structure 68 (FIG. 7), described above, which is operable from the backside of the inner housing by a rotation-imparting tool (not shown) to provide rotation to rod 93. Door 90 includes mask or cover portion 91 and extension portion 92 connected to rod 93.

In operation, door 90 is shown in the open, enabled position in FIG. 8 which allows lens 62 to provide a lookdown zone because mask or cover portion 91 is not covering lens 62 and transmission of radiant energy to detector 56 from the exterior of the intrusion detector unit is permitted. Upon rotation of rod 93 via the engagement structure, door 90 is rotated or pivoted to the closed, disabled position as shown in FIG. 9 in which mask or cover portion 91 substantially covers lens 62 and prevents any transmission of radiant energy to reach detector 56. Mask or cover portion 91 may be made of any suitable material similar to mask 64 (FIGS. 4-6), described above. To return door 90 to the open, enabled position, as shown in FIG. 8, rod 93 is rotated in the opposite direction until mask or cover portion 91 no longer covers lens 62, thereby enabling the lookdown zone.

In yet another alternative embodiment shown in FIGS. 13, 14, 15*a-d*, and 16*a-d*, a sliding mask or cover 100 is utilized in the intrusion detector unit to provide the selective enablement and disablement of the lookdown zone associated with detector 56. Mask 100 may be slidingly movable between the open, enabled position and the closed, disabled position. Mask 100 includes first surface or face 108 and second surface or face 110 which faces detector 56 in operation. Protrusion 102 extends from first surface 108. Mask 100 includes side portions 114 and mounting structure 60 includes mounting rails 112 in which side portions 114 of mask 100 are in sliding engagement. Actuator 104 extends through PCB 54 similar to cam 66 (FIGS. 4-7) described above and includes second portion 74 and third portion 76 substantially identical to cam 66 (FIGS. 4-7) described above. Thus, actuator 104 includes engagement structure 68 substantially identical to structure 68 provided on cam 66 (FIGS. 4-7) described above to provide a mechanism for imparting rotary motion to actuator 104. Actuator 104 also includes first portion 116 which is substantially cylindrically-shaped and has slot 118 formed therein. Slot 118 begins at first end 130 near end 120 of first portion 116 and then wraps 180° around the cylindrically-shaped first portion 116 while simultaneously moving toward end 122 of first portion 116 to finish at second end 132. Thus, slot 118 forms a curved, non-linear path around approximately 180° of first portion 116 which protrusion 102 of mask 100 can follow to thereby impart sliding movement of mask 100 relative to lens 62, as described below.

Figure 13:
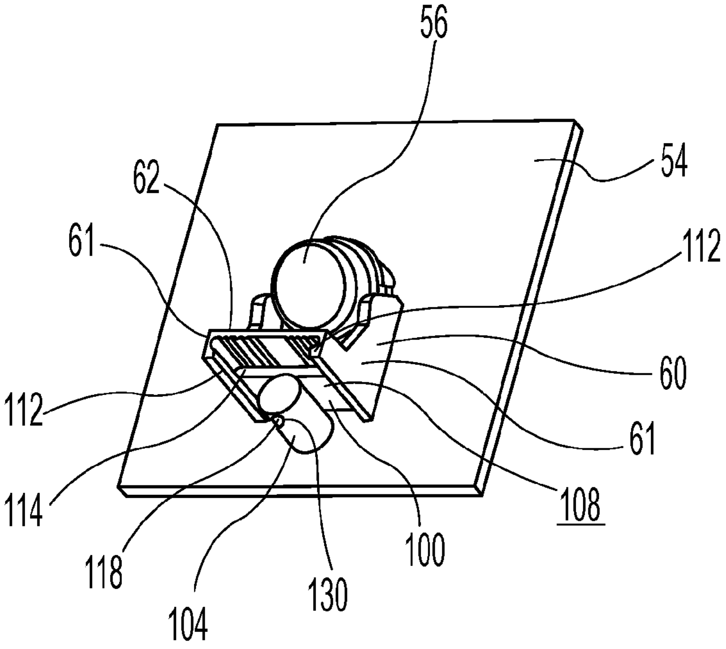
FIG. 13 is a close-up perspective view of the detector, lens assembly, and lookdown zone mask of an intrusion detector unit according to yet another embodiment, further illustrating the lookdown zone mask in an open, enabled position.
Figure 14:
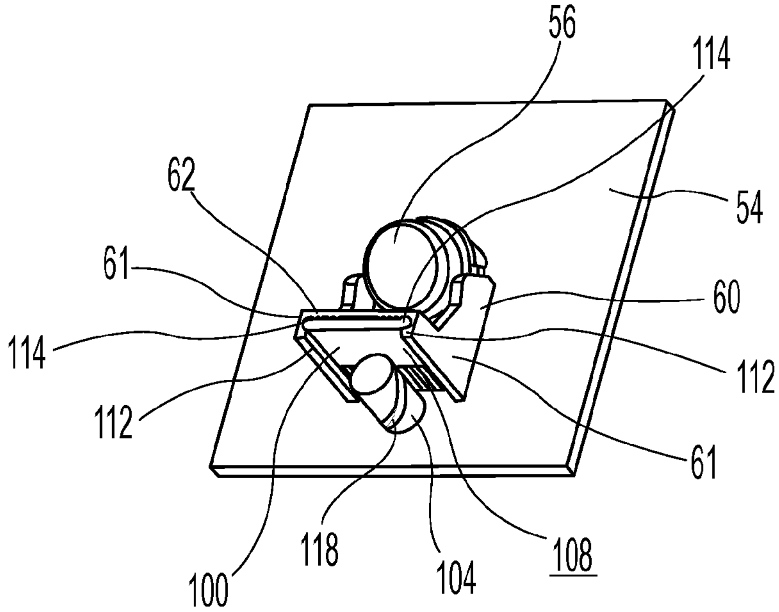
FIG. 14 is a close-up perspective view of the detector unit of FIG. 13, further illustrating the lookdown zone mask in a closed, disabled position.
Figure 15A:
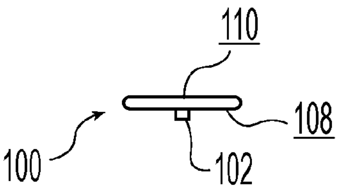
FIGS. 15*a-d* are perspective views of the mask of FIGS. 13 and 14.
Figure 15B:
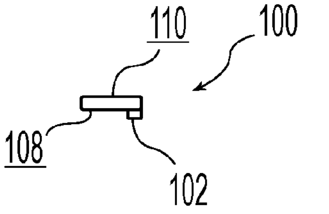
Figure 15C:
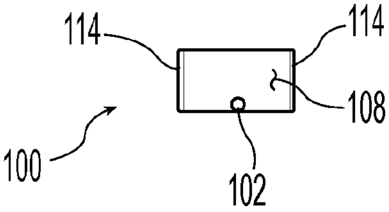
Figure 15D:
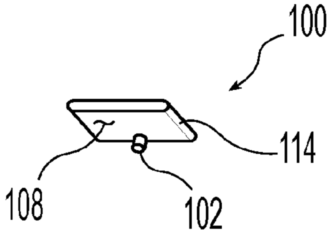
Figure 16A:
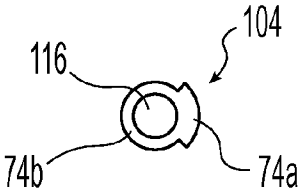
FIGS. 16*a-d* are perspective views of the actuator of FIGS. 13 and 14.
Figure 16B:
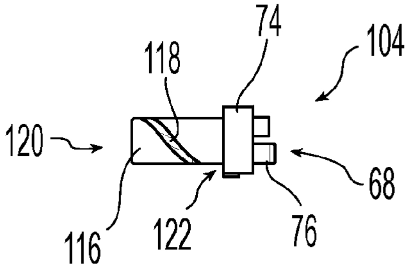
Figure 16C:
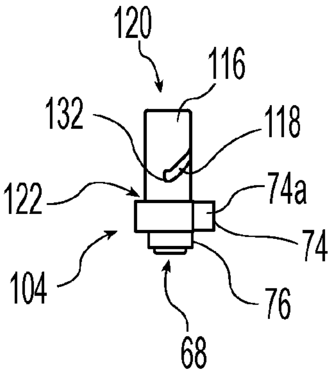
Figure 16D:
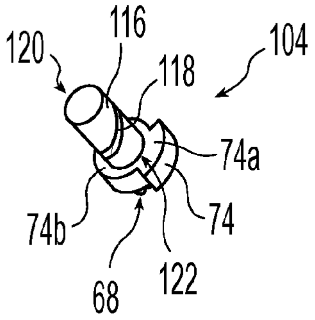

In operation, mask 100 is shown in the first, open, enabled position in FIG. 13 which allows lens 62 to provide a lookdown zone because mask 100 is not covering lens 62 and transmission of radiant energy to detector 56 from the exterior of the intrusion detector unit is permitted. Upon rotation of actuator 104 via a rotation-imparting tool engaging with engagement structure 68, the recess in actuator 104 provided by slot 118 in which protrusion 102 is positioned moves away from end 120 and toward end 122 of first portion 116. This, in turn, causes mask 100 to be slidingly moved relative to mounting structure 60. Upon a full 180° rotation of actuator 104 by which rotation moves protrusion 102 within slot 118 from first end 130 to second end 132, mask 100 is moved to the second, closed position in which mask 100 substantially covers lens 62 and prevents any transmission of radiant energy to reach detector 56. Mask 100 may be made of any suitable material similar to mask 64 (FIG. 4-6) or 90 (FIGS. 8 and 9), described above. To return mask 100 to the open, enabled position, as shown in FIG. 13, actuator 104 is rotated 180° in the opposite direction, thereby moving protrusion 102 from second end 132 to first end 130 of slot 118, at which point mask 100 no longer covers lens 62 and thus, enables the lookdown zone.

The structure and operation of door or cover 90, mask or cover 64, and mask or cover 100 as described herein advantageously permits easy retrofitting to existing intrusion detector units to improve the functionality of these units.

While this invention has been described as having exemplary designs, the present invention may be further modified within the spirit and scope of this disclosure. This application is therefore intended to cover any variations, uses, or adaptations of the invention using its general principles.

What is claimed is:

1. An apparatus for enabling and disabling a lookdown zone in an intrusion detector unit including a substrate and a housing, the apparatus comprising:
- a detector mounted within the housing;
- a lens mounted proximate said detector, said lens capable of providing the lookdown zone; and
- a cover associated with said lens, said lens positioned between said detector and said cover, said cover movable between a first, lookdown zone enabled position and a second, lookdown zone disabled position, wherein said cover in said second position substantially covers said lens.

2. The apparatus of claim 1, further comprising an actuating mechanism, said mechanism operable to move said cover between said first position and said second position.

3. The apparatus of claim 2, wherein said actuating mechanism pivotally actuates said cover between said first position and said second position.

4. The apparatus of claim 3, wherein said actuating mechanism includes a cam surface.

5. The apparatus of claim 4, wherein said cover includes an angled surface, said angled surface in mating engagement with said cam surface.

6. The apparatus of claim 2, wherein said actuating mechanism slidably actuates said cover between said first position and said second position.

7. The apparatus of claim 6, wherein said actuating mechanism includes a slot and said cover includes a protrusion, said protrusion in engagement with said slot.

8. The apparatus of claim 2, wherein said actuating mechanism extends through the substrate and includes an engagement structure for engagement with a rotation-imparting tool.

9. The apparatus of claim 1, further comprising a lens assembly including a mounting structure and said lens.

10. The apparatus of claim 9, wherein said cover includes mounting posts, said mounting posts in pivotal engagement with said mounting structure.

11. The apparatus of claim 1, wherein said cover comprises opaque material, said cover preventing transmission of radiant energy therethrough.

* * * * *